United States Patent [19]
Zoya

[11] 4,007,592
[45] Feb. 15, 1977

[54] POWER TRANSMISSION
[75] Inventor: Walter J. Zoya, Rolling Hills Estates, Calif.
[73] Assignee: Sperry Rand Corporation, Troy, Mich.
[22] Filed: Nov. 13, 1975
[21] Appl. No.: 631,760
[52] U.S. Cl. .................................. 60/391; 60/395
[51] Int. Cl.² ........................................ F15B 21/12
[58] Field of Search ............ 60/388, 391, 395, 448, 60/449

[56] References Cited
UNITED STATES PATENTS

| | | |
|---|---|---|
| 2,714,288 | 8/1955 | Davis .................................. 60/395 |
| 2,763,988 | 9/1956 | Newell ................................. 60/388 |
| 2,939,285 | 7/1960 | Hawkins et al. ...................... 60/395 |

Primary Examiner—Edgar W. Geoghegan
Attorney, Agent, or Firm—Theodore Van Meter

[57] ABSTRACT

A speed controller for a rotary pump and motor hydraulic power transmission comprises a pair of pulse generators, one driven at a reference speed and the other proportionally to motor speed. An algebraic summing circuit connects the two pulse generators to the displacement regulator of the hydraulic pump. Error signals produced by the changes in phase of the pulse generators adjust the pump displacement to maintain the motor speed in step with the reference speed.

5 Claims, 6 Drawing Figures

POWER TRANSMISSION

In rotary hydraulic power transmission systems, for maintaining a predetermined output speed at the motor, it is common to regulate either the pump or the motor displacement, usually the former, by some form of automatic displacement regulator. Regulators which use exclusively hydraulic components are subject to inaccuracies due to leakages or slip in the pump, the motor and the regulator and with certain types of slow speed high torque motors the internal leakage or slip seriously interferes with an accurate maintenance of a desired output speed. Heretofore, this difficulty has been overcome only by the use of expensive electrohydraulic servo controls which often require specialized electric power supplies and in some hazzardous environments are unsafe to use.

The present invention aims to provide an improved speed controller for hydraulic power transmissions which utilizes entirely hydraulic components and which provides a very high degree of accuracy in controlling the motor output speed.

A further object is to provide a speed controller of that character which utilizes a pair of pulse generators connected to the displacement regulator of the transmission so as to produce error signals of the proper corrective sign and magnitude dependent upon the changes in phase between the pulses of the two pulse generators.

These objects are achieved by the provision of a speed controller for a hydraulic power transmission comprising a rotary pump and a rotary motor, one of which has a regulator for its displacement, the controller comprising a reference hydraulic pulse generator for producing an alternately reversing flow of a predetermined quantity, a feed-back pulse generator for producing another alternately reversing flow of a similar quantity, reference means for driving the reference pulse generator at a desired speed, means driving the feed-back pulse generator proportionally to the motor speed, and a circuit connecting the two pulse generators to the displacement regulator to maintain the motor speed in step with the reference means speed in response to error signals produced by relative phase changes between the two pulse generators.

IN THE DRAWINGS

Figure 1:
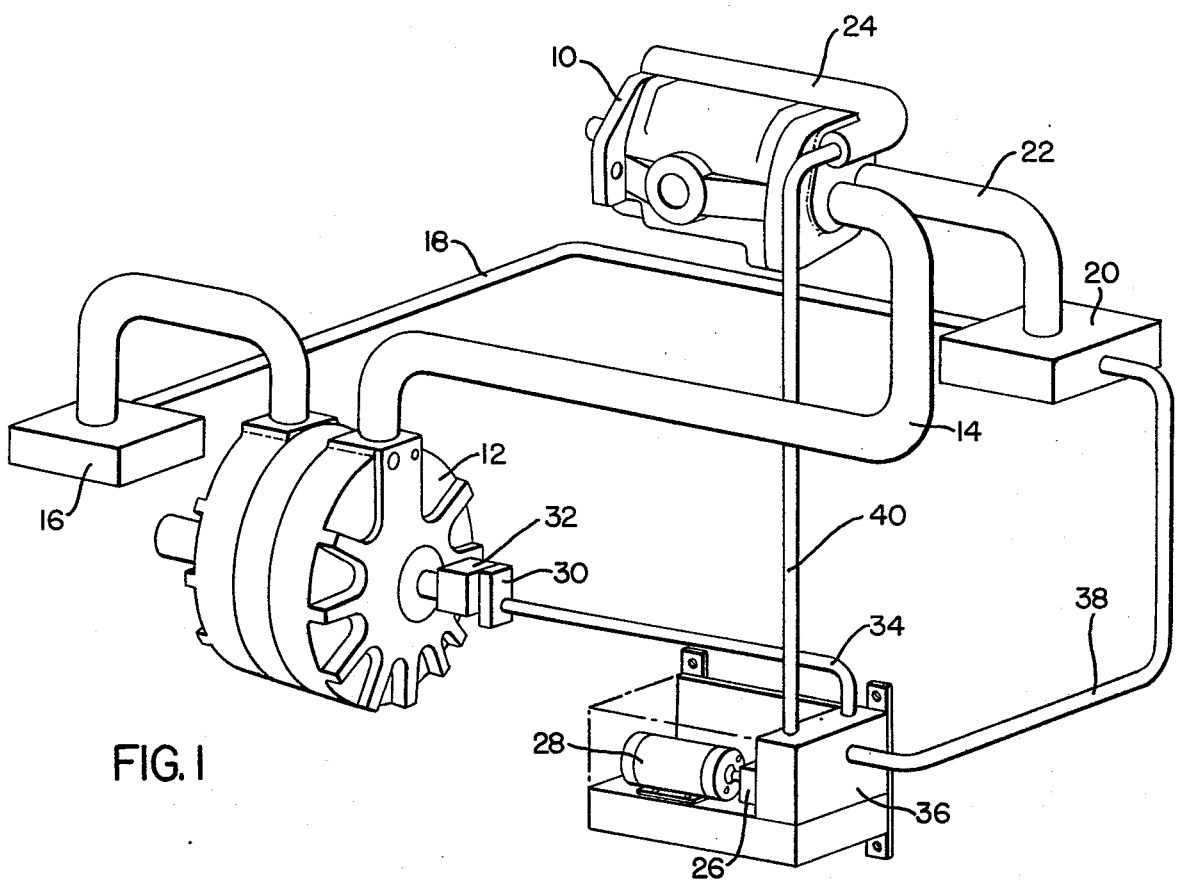
FIG. 1 is a diagrammatic perspective view of a power transmission and controller incorporating a preferred form of the present invention.

Referring to FIG. 1, a hydraulic power transmission comprising a variable displacement pump 10 and a fixed displacement motor 12 are connected by a deliver conduit 14. Return flow from the motor goes to reservoir at 16 which is connected by a conduit 18 to a reservoir 20 which feeds the inlet conduit 22 of the pump 10. A displacement regulator 24 is indicated diagrammatically and may be of the usual simple piston and cylinder type in which a spring biases the piston to increase the pump displacement and hydraulic pressure operates the piston to decrease the displacement.

A speed controller comprises a first pulse generator 26 driven at a reference speed by an electric motor 28 which may be either of constant speed or adjustable speed, depending upon the desired requirements. A second pulse generator 30 is driven from the hydraulic motor 12 through a step-up gear box 32 and is connected to the pulse generator 26 via a line 34 and a summing circuit block 36 which in turn receives reservoir fluid through a line 38 and is connected to the displacement regulator 24 through a line 40.

Figure 2:
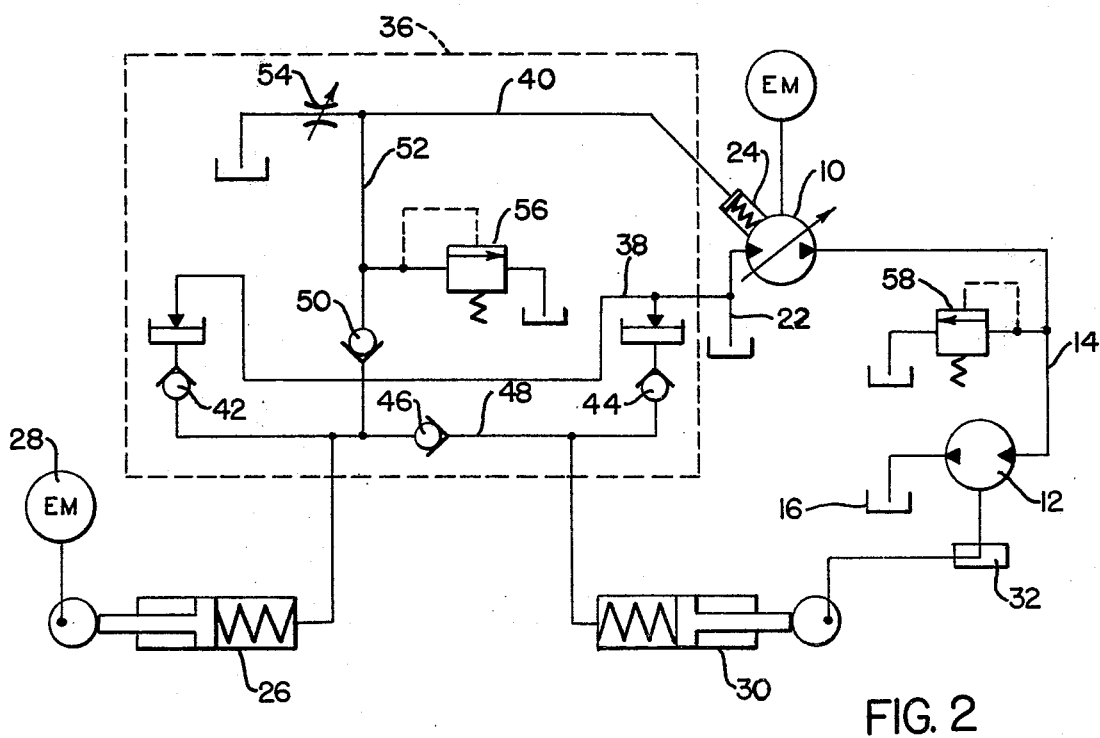
FIG. 2 is a circuit diagram of the system illustrated in FIG. 1.

This circuit is illustrated diagrammatically in FIG. 2, including also the internal circuit of the block 36. Each of the pulse generators 26 and 30 may consist of a simple piston and cylinder, in the case illustrated, being driven by eccentric cams on their delivery strokes and by internal springs on their intake strokes. Within the block 36, the circuit includes replenishing check valves 42 and 44 connected to the pulse generators 26 and 30 respectively. A one-way connection comprising the check valve 46 and the line 48 connects the two pulse generators. A delivery check valve 50 and line 52 connects to a bleed path 54 as well as to the conduit 40 leading to the displacement regulator 24. The usual maximum pressure relief valves 56 and 58 may be provided for the delivery lines 52 and 14 respectively.

In operation, with the pump 10 being driven to deliver fluid to the hydraulic motor 12 and with the reference electric motor 28 being driven at a predetermined speed, the action may first be considered when the speeds of the two pulse generators are identical and the feedback pulse generator 30 lags the reference pulse generator 26 by a 90° phase angle. This action is illustrated in FIG. 3b. There the integrated sum of the two pulse flow rates creates a mean flow indicated by the horizontal line labeled "mean flow out". This quantity is also the quantity flowing out through the bleed path 54. Thus, there is no error signal to cause a change in the displacement regulator 24 of the transmission pump.

Figure 3A:
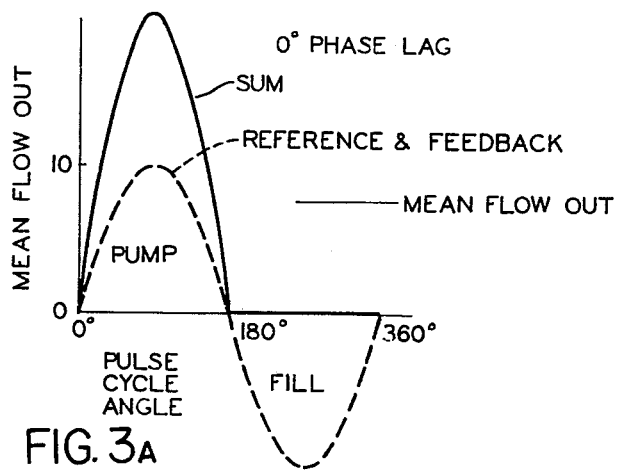
FIGS. 3a, 3b and 3c are graphs illustrating the action of the pulse generators under different phase lag relationships.
Figure 3B:
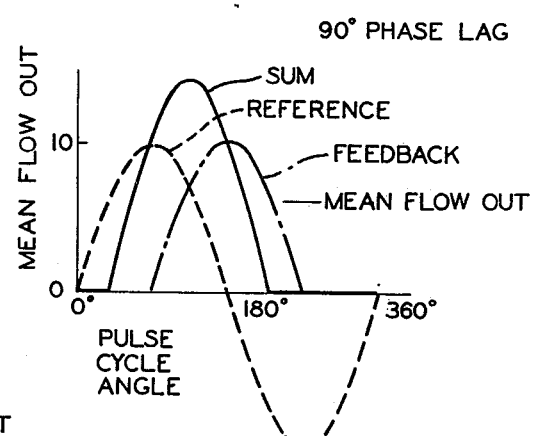

If the motor speed tends to increase relative to the reference so that the phase lag of the pulse generator 30 relative to the pulse generator 26 decreases to say, zero degrees, the condition is illustrated in FIG. 3a where the sum of the synchronized pulses creates a mean flow out which is substantially larger than that illustrated in FIG. 3b. Thus, that portion of the flow which is not dissipated through the bleed path 54 goes immediately to the displacement regulator 24 and reduces the pump displacement to bring the motor speed immediately down and again increase the phase lag to 90°.

Figure 3C:
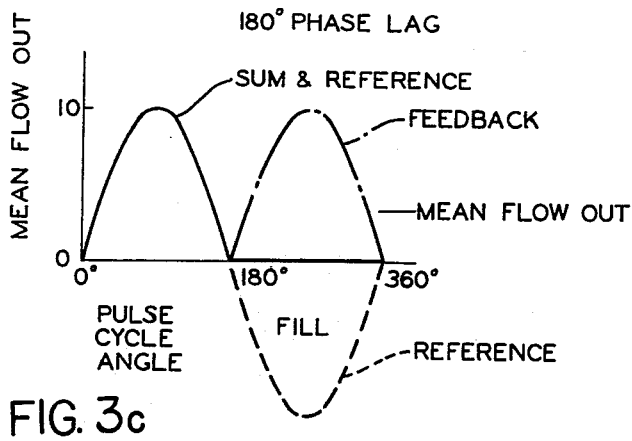

Similarly, if the speed of the motor 12 decreases momentarily, the phase lag between the two pulse generators increases and at 180° the condition is illustrated in FIG. 3c where the mean flow out is less than that taken by the bleed path 54 and the difference in that flow out is made up by the spring in the regulator 24 displacing enough to make up the difference. This immediately speeds up the motor 12 to again bring back the phase lag to 90°.

Figure 4:
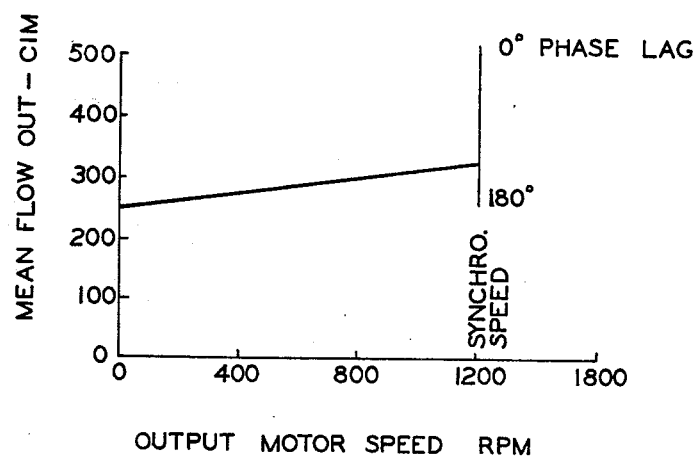
FIG. 4 is a graph illustrating the action of the controller during start-up conditions.

It will be seen that this system results in error signals which cause very quick corrections of variations in motor speed after the system is once brought up to the desired speed. Referring to FIG. 4 which illustrates the conditions occuring during start-up, it may take more than one phase cycle of the pulse generators to bring the hydraulic motor into synchronous speed, but once it has achieved that, any load changes on the motor and their corresponding speed changes will be instantly reflected in phase differences between the pulse generators which immediately react to adjust the pump displacement and maintain synchronous speed.

I claim:

1. A speed controller for a hydraulic power transmission comprising a rotary pump and a rotary motor, one of which has a regulator for its displacement, the controller comprising a reference hydraulic pulse generator for producing an alternately reversing flow of a predetermined quantity, a feed-back pulse generator for producing another alternately reversing flow of a similar quantity, reference means for driving the reference pulse generator at a desired speed, means driving the feed-back pulse generator proportionally to the motor speed, and a circuit connecting the two pulse generators to the displacement regulator, to maintain the motor speed in step with the reference means speed in response to error signals produced by relative phase changes between the two pulse generators.

2. A speed controller as defined in claim 1 wherein the circuit of the controller includes a one-way connection between the pulse generators and a second one-way connection from the pulse generators to the displacement regulator with a constant flow bleed path from the regulator.

3. A speed controller as defined in claim 2 which includes means replenishing either of the pulse generators whenever it is out of phase with the other one.

4. A speed controller as defined in claim 1 wherein the regulator varies the pump displacement.

5. A speed controller as defined in claim 1 wherein the circuit of the controller includes means for feeding the delivery of one pulse generator to the regulator and means for algebraically summing the delivery of the two pulse generators for comparison with a constant bleed from the regulator.

* * * * *